(12) United States Patent
Chiarini et al.

(10) Patent No.: US 8,727,101 B2
(45) Date of Patent: May 20, 2014

(54) DEVICE FOR CLEANING FLUID SUBSTANCES FROM A CONVEYOR BELT INCLUDING PAINT, VARNISH AND LIKE PRODUCTS

(75) Inventors: Stefano Chiarini, Conselice (IT); Cristian Pungetti, Ozzano Emilia (IT)

(73) Assignee: Cefla Societa' Cooperativa, Imola (IT)

( * ) Notice: Subject to any disclaimer, the term of this patent is extended or adjusted under 35 U.S.C. 154(b) by 0 days.

(21) Appl. No.: 13/526,844

(22) Filed: Jun. 19, 2012

(65) Prior Publication Data

US 2012/0325625 A1 Dec. 27, 2012

(30) Foreign Application Priority Data

Jun. 24, 2011 (IT) .............................. BO2011A0367

(51) Int. Cl.
*B65G 45/10* (2006.01)
*B65G 45/12* (2006.01)

(52) U.S. Cl.
CPC ................ *B65G 45/10* (2013.01); *B65G 45/12* (2013.01)
USPC .......................................... 198/497; 198/499

(58) Field of Classification Search
USPC ........................................ 198/494, 496–499
See application file for complete search history.

(56) References Cited

U.S. PATENT DOCUMENTS

| 3,888,345 | A  | * | 6/1975  | Mitchell ........................ 198/494 |
| 6,321,900 | B1 | * | 11/2001 | Micklethwaite .............. 198/498 |
| 6,447,609 | B1 | * | 9/2002  | Potthoff ........................... 118/70 |
| 6,533,102 | B2 | * | 3/2003  | Franzoni et al. .............. 198/495 |
| 2007/0193603 | A1 | * | 8/2007 | Cezary .............................. 134/6 |

FOREIGN PATENT DOCUMENTS

| EP | 0425969 B1 | 6/1993 |
| EP | 1964795 B1 | 4/2010 |

* cited by examiner

*Primary Examiner* — Mark A Deuble
(74) *Attorney, Agent, or Firm* — Stradley Ronon Stevens & Young, LLP

(57) ABSTRACT

A device for cleaning a conveyor belt soiled with fluid substances, and in particular for machines used for spraying paint or other products, is disclosed. The conveyor belt has an upper section and a lower return section comprising a (a) reverse roller in contact with the return section of the belt to collect the fluid substances on the belt; (b) doctor blade for scraping the fluid substances collected from the reverse roller; (c) at least one secondary belt conveyor mounted on a pair of supporting rollers and disposed beneath the doctor blade for collecting the fluid substances from the doctor blade and for conveying the fluid substances toward one end of said secondary belt conveyor; and (d) means at the end of the secondary belt conveyor for scraping the fluid substances from the secondary belt conveyor and for conveying the substances to a final collection and/or recycling means.

9 Claims, 5 Drawing Sheets

DEVICE FOR CLEANING FLUID SUBSTANCES FROM A CONVEYOR BELT INCLUDING PAINT, VARNISH AND LIKE PRODUCTS

BACKGROUND OF THE INVENTION

1. Field of the Invention

The invention relates to a device for removing externally a fluid substance soiling an endlessly wound conveyor belt driven around at least two end rollers, at least one of which is motor-driven. In particular the device is intended to clean conveyor belts of machines and plants for painting, dyeing or soaking processes, which below are referred to in short and for the sake of simplicity as "painting processes", where the articles to be treated are conveyed through a chamber for spraying the fluid treatment substance such as a paint. The conveyor belt is formed by two sections: an upper outward section, usually carrying the articles to be treated which are coated with the paint spray as they pass through the spraying chamber, and a lower return section which is usually situated outside the said spraying chamber and which, emerging from said chamber, is soiled with paint which must be recovered so that the said conveyor may return clean to the upper section in order to receive new articles to be treated.

2. Description of Related Art

The devices currently used for recovery of the residual paint and for cleaning the belt comprise means for removing the paint from the belt itself with a skimming or scraping operation and comprise cleaning systems which wet the belt with solvent and then dry and clean it, for example using fixed doctor blades or rotating cylinders or a combination of these means. In European Patent No. 425,969 which is in the name of the Applicant the cleaning device comprises a cylinder or roller which operates along the return section of the conveyor belt with a parallel arrangement for example situated opposite the end transmission roller of the conveyor and this roller is rotated in the opposite direction to the direction of feeding of the belt to be cleaned, so as to perform effectively scraping-off of the residual paint, which is separated from this roller by cleaning means through the action of at least one doctor blade and falls into a collection and removal chute by means of gravity. The said counter-rotating cleaning roller, also called reverse roller, may be partially immersed with a bottom part thereof, inside a tank containing solvent so as to be completely or partially cleaned and convey a film of the said solvent into the zone of contact with the bottom section of the belt to be cleaned, in order to wet the belt zone from which the paint is removed and ensure that the same section of the conveyor leaves the reverse roller with an amount of solvent which has the function of softening further the residual paint which thus may be more easily removed by following cleaning means comprising a further reverse roller and/or fixed doctor blades and/or rotating brushes and any other suitable means. This reverse-roller cleaning system over time has proved to be very effective and advantageous, but has limitations due to the difficulty of removing rapidly the paint discharged by the cleaning blade of the reverse roller, without requiring the use of solvent and without the formation of lumps. In an attempt to solve these problems, various solutions have been attempted, one of which consists for example in mounting the cleaning blade along the longitudinal edge of a straight channel inside which the paint is collected and then pushed out from the ends of this channel by the alternating movement, inside the latter, of a scraping knife. Another solution, which is described for example in European Patent No. 1,964,795 in the name of the same Applicant, envisages using instead of the doctor blade, the longitudinal portion of the upper section of a motor-driven conveyor which performs simultaneously both the function of a doctor blade and means for rapid removal of the paint detached from the reverse roller. The first of the said solutions has the drawback that the action of the said scraping knife tends to cause stressing of the paint and the formation of lumps such that the paint cannot be easily reused. At the end of the working shift or when it is required to change the paint product and it is required to clean the paint recovery means, cleaning of said channel and the scraping spatula which operates inside it is not easy and requires a long time. The second of said solutions has a high cost and poses design-related problems with regard to ensuring uniformly distributed contact between the bottom cleaning conveyor and the reverse roller and is difficult to manage also owing to the need to ensure proper cleaning of the said bottom conveyor.

SUMMARY OF THE INVENTION

The present invention aims to overcome the drawbacks of the prior art by causing the paint removed from the reverse roller by at least one doctor blade to fall onto an underlying secondary conveyor which conveys it away rapidly and is then removed from this secondary conveyor by means of any suitable cleaning and recovery means.

BRIEF DESCRIPTION OF THE DRAWINGS

Further characteristic features of the invention and the advantages arising therefrom will emerge more clearly from the following description of a preferred embodiment thereof provided purely by way of a non-limiting example in the figures of the three accompanying sets of drawings in which.

DESCRIPTION OF THE PREFERRED EMBODIMENT

Figure 1:
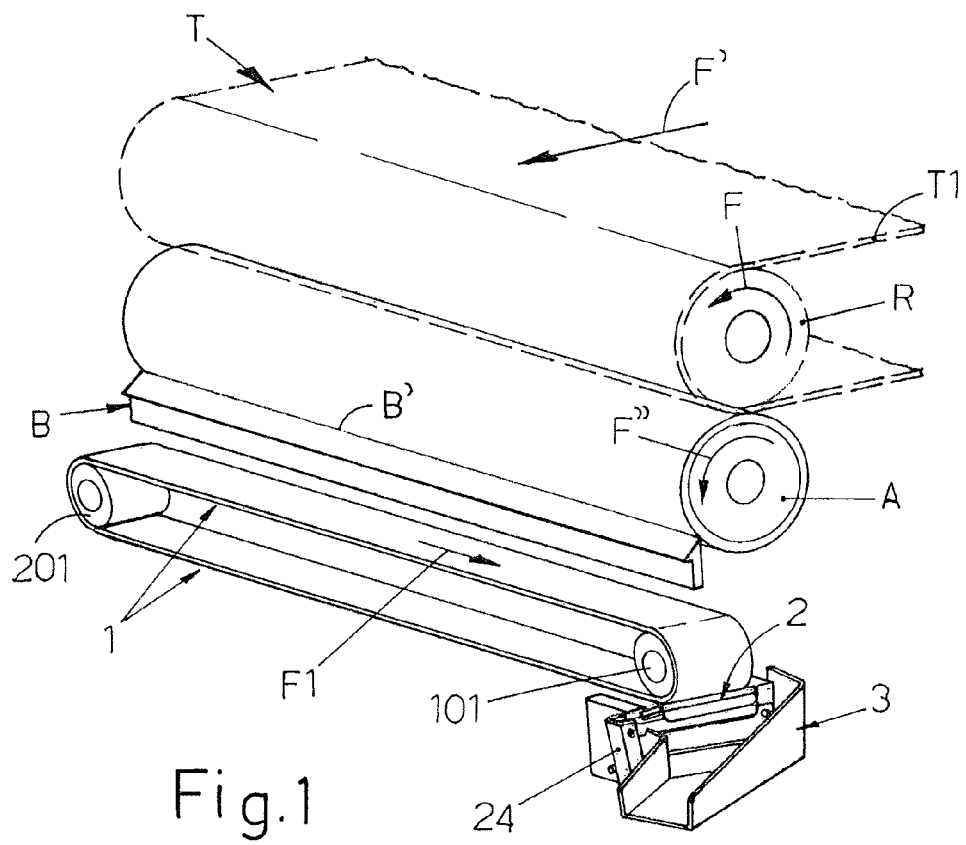
FIG. 1 shows a perspective and schematic view of the main components of the device.
Figure 3:
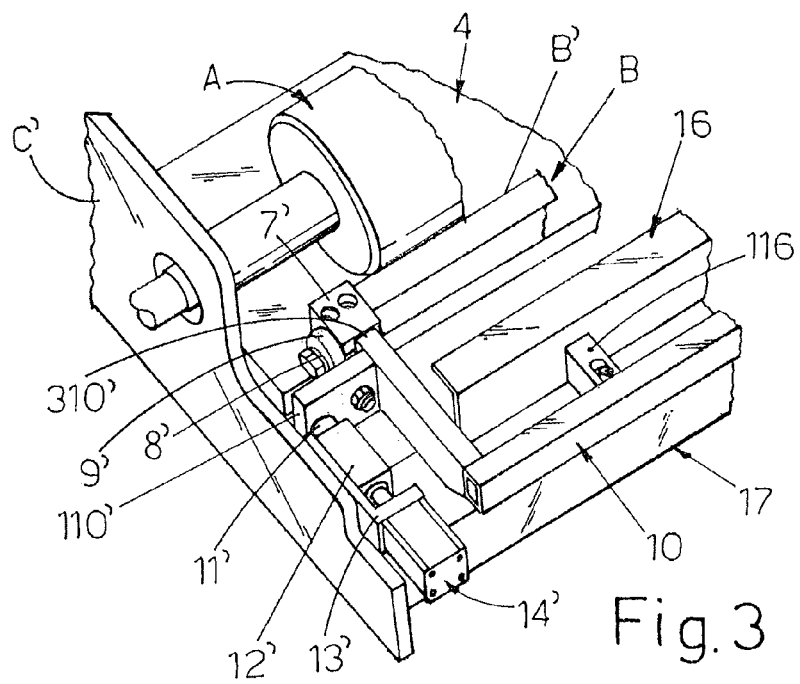
FIG. 3 shows a perspective view of one side of the device according to FIG. 2.
Figure 2:
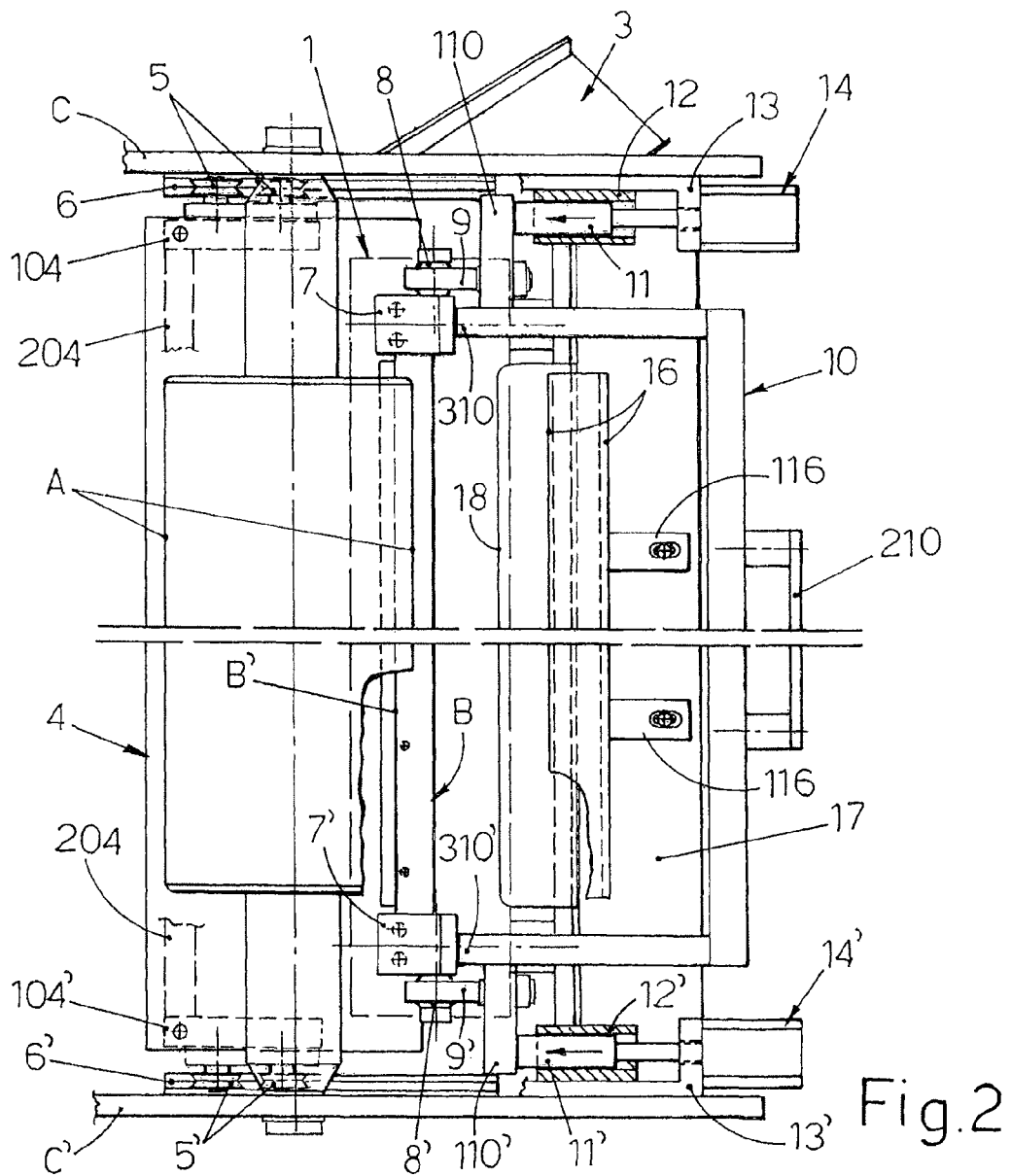
FIG. 2 shows a top plan view of the device in the working condition.
Figure 4:
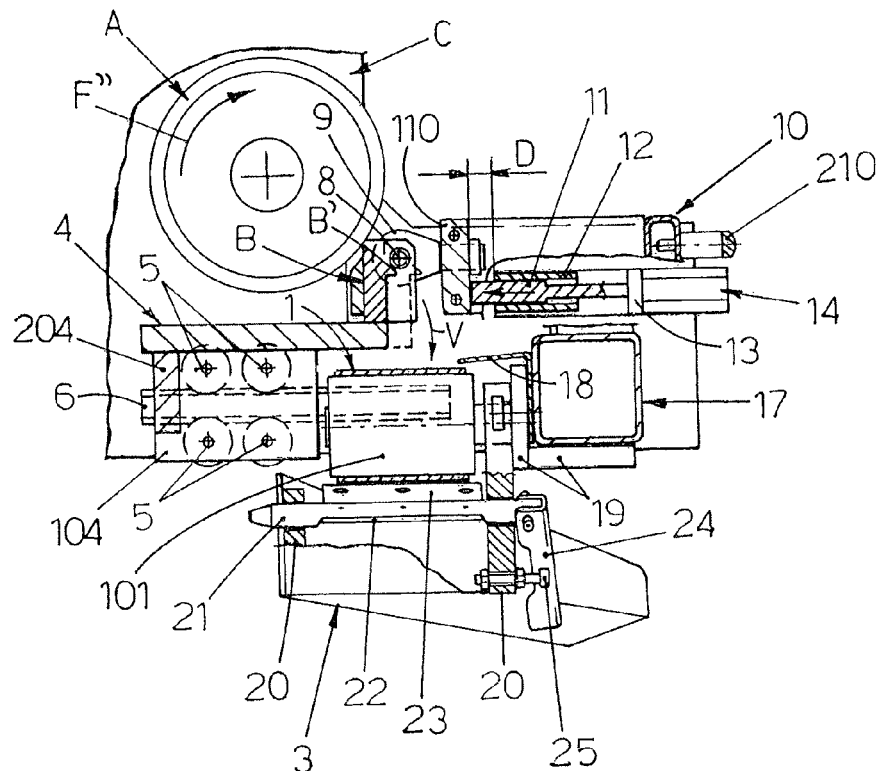
FIGS. 4, 4a and 4b show the device laterally, with parts cross-sectioned, also in the working condition and in the subsequent rest positions, respectively.
Figure 4A:
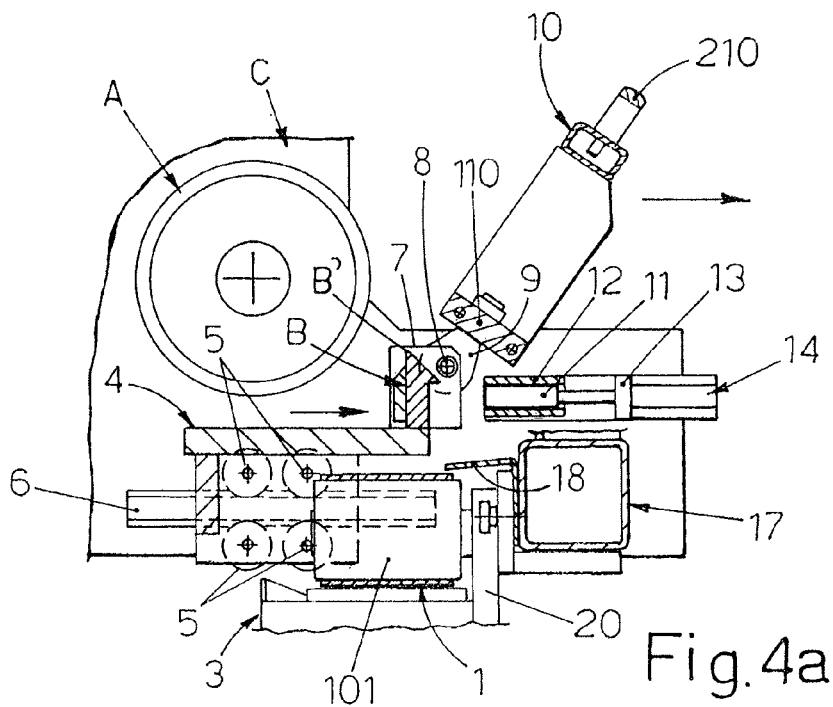
Figure 4B:
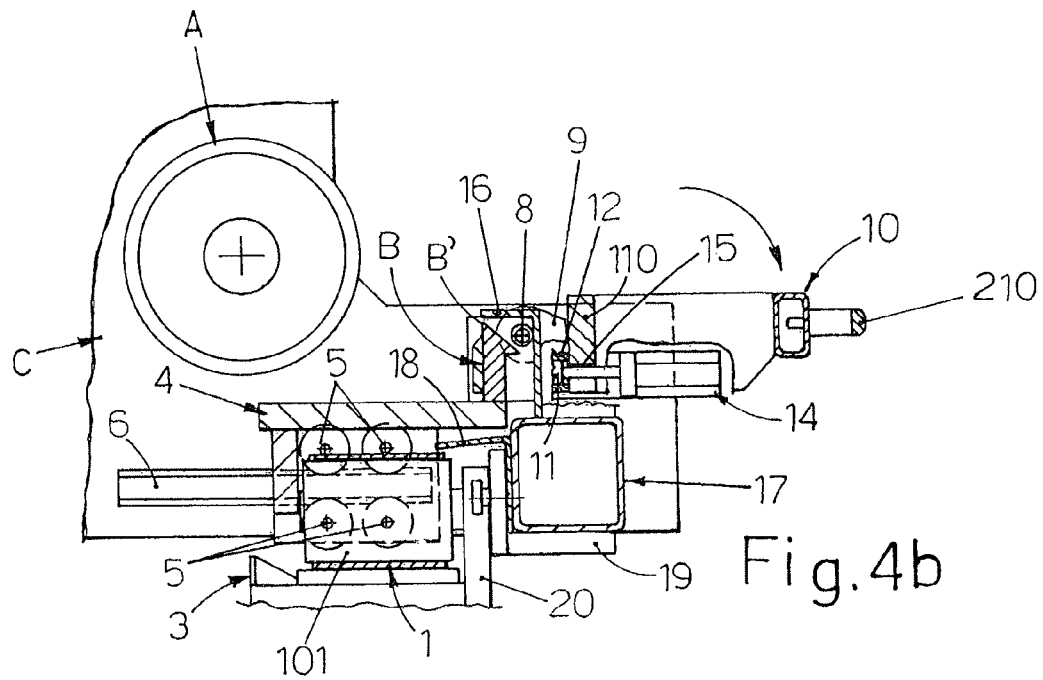
Figure 5:
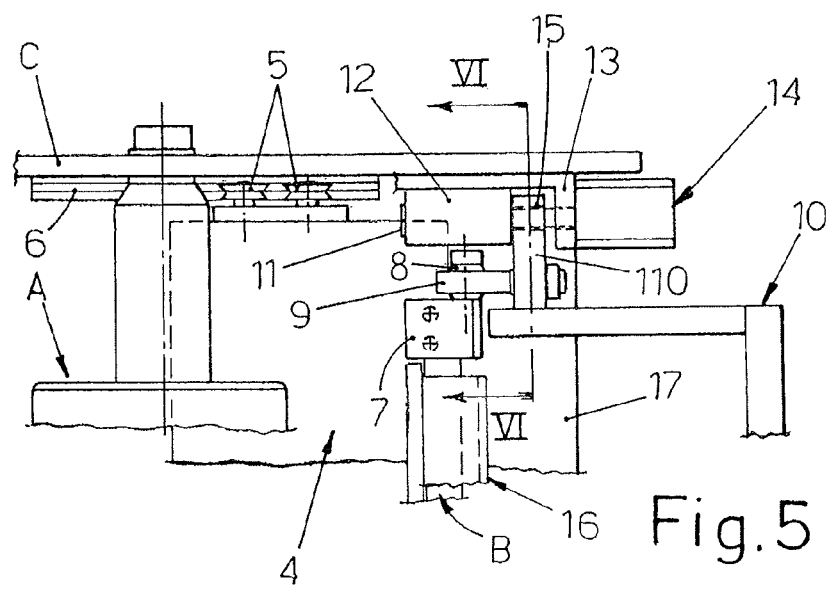
FIG. 5 shows a top plan view of one side of the device in the condition according to FIG. 4b.
Figure 6:
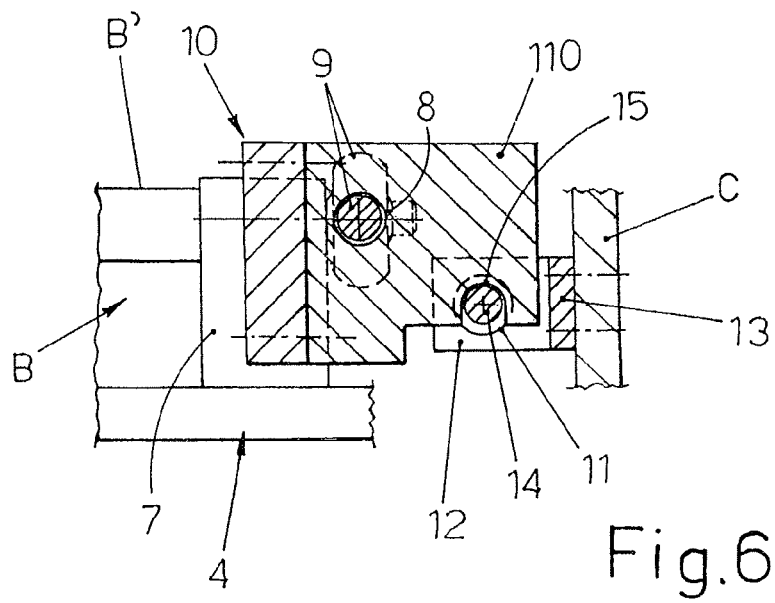
FIG. 6 shows details of the device shown along the cross-sectional line VI-VI according to FIG. 5.
Figure 7:
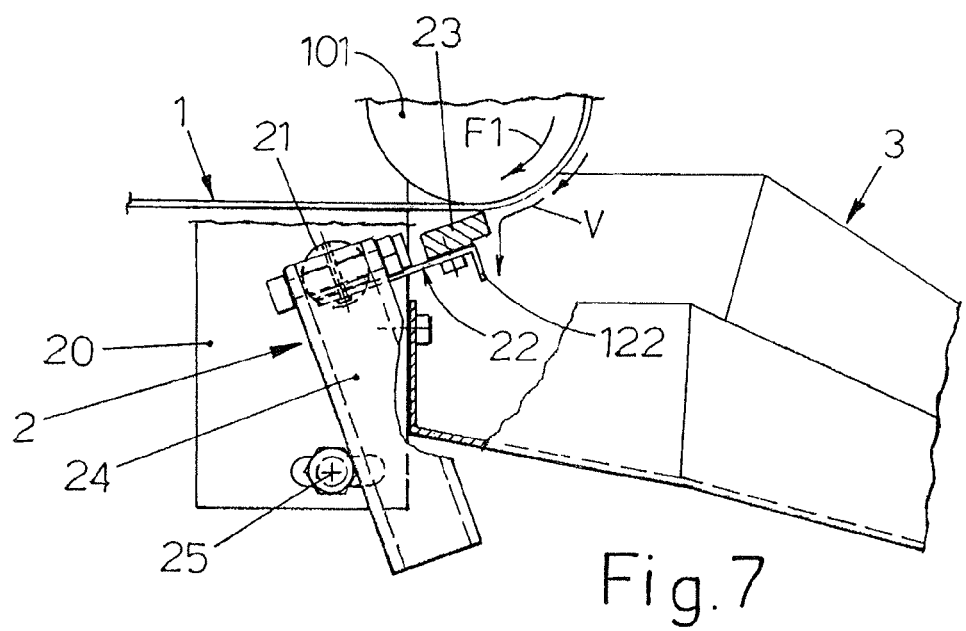
FIG. 7 shows, laterally and with parts cross-sectioned, details relating to the doctor blade means for cleaning the secondary conveyor.

In FIG. 1, T denotes the conveyor of the painting machine, which is driven with one end on the roller R which rotates in the direction of the arrow F and the upper section T1 of which emerges from the painting machine and travels in the same direction indicated by the arrow F'. The letter A denotes the reverse roller which is parallel to the roller R and situated underneath the latter and which operates the lower return section of the conveyor T, rotating in the direction indicated by the arrow F" and with a speed such as to operate with friction on the conveyor T so as to remove from the latter the paint which has soiled it during transit through the tunnel of the painting machine. B denotes the doctor blade which acts on the reverse roller A so as to remove from it the paint collected and, from the said doctor blade B, the paint falls by means of gravity onto the upper section of a secondary belt conveyor 1 which is operated by suitable means, not shown, in the direction indicated by the arrow F1 so as to convey the paint collected to one end of this secondary conveyor, where cleaning means 2 of any suitable type operate and where a small hopper 3 for collecting and removing the recovered paint is provided. The secondary conveyor 1 may be parallel to the doctor blade B or made be slightly inclined with respect thereto, either along the vertical plane and/or along the horizontal plane. It is evident how the novel solution proposed is highly reliable, how it is able to remove rapidly the paint collected from the reverse roller towards the final removal means 3 and how the paint is not stressed also because it is scraped off in large quantities by the cleaning means 2, since all the paint which falls from the main doctor blade B is conveyed by the conveyor 1 into the small space inside which these cleaning means 2 operate. Compared to the known systems mentioned in the introduction, the novel device also has the advantage that it can be cleaned more easily and rapidly both during operation and at the end of the working shifts or working cycles for which the use of different paints is envisaged, also in the case of the solutions indicated below. From FIGS. 2, 3 and 4 it can be seen that the doctor blade B with a simple or double sloping profile has a width which is suitably greater than that of the reverse roller A so as to project with sections of sufficient length from the ends of this roller and the said doctor blade is fixed on the side of a main plate 4 situated underneath the said roller A and provided at the ends with sidewalls 104, 104' which are interconnected by at least one cross-piece 204 and on the outer side carry pairs of grooved roller wheels 5, 5' which travel along horizontal, straight and profiled guides 6, 6' perpendicular to the axis of the roller A and fixed onto the said sidewalls C, C' of the structure which rotatably supports the spindle of the reverse roller A. It is understood that, in place of the aforementioned roller wheels, sliding blocks or other suitable means may be envisaged, provided they are such as to ensure that the doctor blade B can be adequately adapted automatically to the reverse roller A as explained later. Still with reference to FIGS. 2 to 4 it can be seen that the plate 4, at the ends of the doctor blade B, has fixed thereon small uprights 7, 7' which have, hinged on their outer side, by means of ball joints 8, 8', short tie-pieces 9, 9' which are fixed perpendicularly with their opposite ends to side lugs 110, 110' of a handle 10 having a U-shaped form in plan view and provided in the middle with a grip 210 and that, when the device is in the active position, it is arranged horizontally, for example with its ends 310, 310' resting against the said small uprights 7, 7'. In this same position, the side lugs 110, 110' of the handle 10 are located in front of thrusters 11, 11' which are slidable inside guides 12, 12' integral with supports 13, 13' which are fixed to the aforementioned sidewalls C, C' and which have, fixed thereon, via their body pneumatic cylinders 14, 14' which with their stem actuate the said thrusters 11, 11' and by means of which the doctor blade B is pushed with its sharp edge B' in close and uniformly distributed contact with the reverse roller A. It is clear how, owing to the means described, the doctor blade may automatically adapt, closely and with precision, to the surface of the reverse roller A, without the need for machining operations or precise assembly of the various parts which form said means. When the doctor blade is in the working position and the cylinders 14, 14' are not activated, it is possible to operate the grip 210 of the handle 10 and retract the entire assembly of the doctor blade B into the position indicated by broken lines in FIG. 4, with a travel movement indicated by D in FIG. 4, until the side lugs 110, 110' shown in FIG. 2 touch the guides 12, 12'. This operation may be performed in a safe manner by the operator and allows the cutting edge. B' of the doctor blade B to be cleaned periodically and rapidly, for example using a scraper mounted on a handle of appropriate length, not shown in the drawings. From FIG. 6 it can be seen that the side lugs 110, 110' of the handle 10 are provided with bottom slots 15 aligned with the stems of the cylinders 14, 14' so as to allow the following operation to be performed. With the cylinders 14, 14' deactivated, it is possible to raise the handle 10 with rotation on the ball joints 8, 8', as shown in FIG. 4a, and it is possible to retract the carriage with the doctor blade B until the latter is positioned underneath a protective cover 16 in the form of an overturned L which with its supports 116 may be fixed adjustably in the correct position on a cross-member 17 in turn fixed with its ends to the sidewalls C, C'. Once the doctor blade has been retracted, the handle 10 can be rotated downwards and the side lugs 110, 110' can be positioned behind the thrusting pins 11, 11', with their slots 15 which are arranged over the stems of the cylinder 14, 14', as shown in FIGS. 4b, 5 and 6. The doctor blade remains securely in the retracted rest position since the lugs 110, 110' are disengaged from the axial action of the stems of the cylinders 14, 14 and are contained between the supports 13, 13' and the guides 12, 12'. In this same rest position, as can be seen from FIG. 4b, the cutting profile B' of the doctor blade B remains positioned underneath the protective cowl 16 so that the said doctor blade B may be cleaned safely by the operator without the latter being able to touch its cutting edge B'. During this cleaning operation and also when the device is in the working position, a special cowl 18 fixed for example to the cross-member 17 ensures correct conveying of the paint on the conveyor 1. The transmission rollers 101, 201 of the secondary conveyor belt 1 and the drive means which operate at least one of these rollers are supported for example by the cross-member 17 by means of an interface structure 19 which also carries supports 20 to which the hopper 3 is removably fixed and on which the cleaning means 2 are mounted, said cleaning means comprising for example a spindle 21 which is mounted rotatably and transversely on the said supports 20 and which has, fixed transversely thereon, a flat spring 22 which supports on the other end a doctor blade 23 which is made of suitable plastic material and which performs scraping and cleaning of the portion of the conveyor belt 1 which passes from the upper section to the lower section, during driving over the roller 101. The spindle 21 of the doctor blade is provided at one end with an adjustable-position handle 24 which may be set so as to cooperate with an adjusting device 25 so as to provide the spring 22 with the necessary flexing movement for ensuring the correct degree of interference between the doctor blade 23 and the conveyor 1. The end of the spring 22 which supports the doctor blade 23 is suitably folded downwards so as to form a drip plate 122 which forces all the paint collected by the doctor blade to fall into the underlying hopper 3. Special microswitches and/or safety sensors, not shown, may be envisaged for detecting the correct working position or rest position of the main components of the device as described

We claim:
1. A device for cleaning an endless conveyor belt that is soiled with fluid substances dispersed thereon, said endless conveyor belt having an upper section and a lower return section, comprising:
   a. a reverse roller in contact with said lower return section of said endless conveyor belt for collecting the fluid substances dispersed on said lower return section of said endless conveyor belt;

b. a doctor blade in scraping contact by a cutting edge of said doctor blade with said reverse roller for scraping said fluid substances collected from said reverse roller;

c. at least one secondary endless conveyor belt mounted on a pair of supporting rollers and disposed beneath said doctor blade for collecting said fluid substances falling from said doctor blade and for conveying said fluid substances toward one end of said secondary conveyor belt; and d. means at said one end of said secondary conveyor belt for scraping said fluid substances from said secondary conveyor belt for cleaning said secondary conveyor belt and for conveying said fluid substances toward a final collection means.

2. The device for cleaning an endless conveyor belt, according to claim 1, wherein the doctor blade is mounted on a carriage slidably movable on at least one guides which are fixed in position substantially perpendicular to said doctor blade and to said reverse roller, wherein said carriage is moved into a working position by a plurality of symmetrically arranged fluid pressure actuating cylinders and pistons to provide a distributed contact of said cutting edge of said doctor blade against said reverse roller owing to a sufficient play between said carriage and said at least one guides allowing said doctor blade to adjust to said reverse roller.

3. The device according to claim 2, wherein said carriage has a pivoting handle having a central grip and with side lugs which are hinged via ball joints on short uprights which are fixed on said carriage, such that, when said device is in the active position, said handle is positioned horizontally, resting on any suitable support elements, and with the said side lugs said handle is positioned in front of thrusters which are connected to a stem of said actuating cylinders.

4. The device according to claim 3, wherein said means for pushing said carriage with said doctor blade is structured in such a manner that, if said cylinders are not actuated, it is possible to pull said handle so as to move the doctor blade away from the reverse roller with a small travel movement sufficient to allow cleaning of the said doctor blade with a scraper.

5. The device according to claim 3, wherein, when said actuating cylinders are not operated, it is possible to raise said handle and move the doctor blade away from the reverse roller and, at the end of said movement, it is possible to lower the handle into said horizontal position, with said side lugs are arranged on top of and without dynamic interference with said stem of said actuating cylinders, such that said doctor blade is locked in said rest position.

6. The device according to claim 5, wherein when the carriage with said doctor blade is in said rest position, said doctor blade has its cutting edge underneath a protective cowl allowing for safe cleaning of said doctor blade.

7. The device according to claim 6, wherein said protective cowl is secured with adjustable supports on a fixed crossmember which also supports the rollers of said secondary endless belt conveyor, and the secondary conveyor belt for collecting and removing the paint discharged from said doctor blade, and which also supports a gutter above which said doctor blade is arranged in said rest position, such that said gutter collects the cleaning liquid and any paint which falls from above and is discharged onto the upper section of said secondary conveyor belt.

8. The device according to claim 7, wherein said crossmember carries supports which extend on the sides of an end part of said secondary conveyor belt so as to removably support said hopper and a cleaning means which comprises a spindle which is mounted rotatably and transversely on said supports and which has, transversely fixed thereon, a flat spring which carries on a distal end of said flat spring, a second doctor blade which performs scraping and cleaning of the portion of the secondary conveyor belt while said portion of the secondary conveyor belt passes from the upper section to the lower section, said spindle having at one end a handle which may be set so as to cooperate with an adjusting device so as to impart to said flat spring a necessary flexing movement for ensuring the correct degree of interference between said second doctor blade and the secondary conveyor belt being cleaned.

9. The device according to claim 8, wherein the end of said flat spring which supports the second doctor blade is folded downwards so as to form a drip plate forcing the paint collected by said second doctor blade to fall into an underlying hopper.

\* \* \* \* \*